May 28, 1929.  F. C. BIGGERT, JR  1,715,219
APPARATUS FOR STRETCHING AND COILING STRIP MATERIAL

Filed Sept. 25, 1926  2 Sheets-Sheet 1

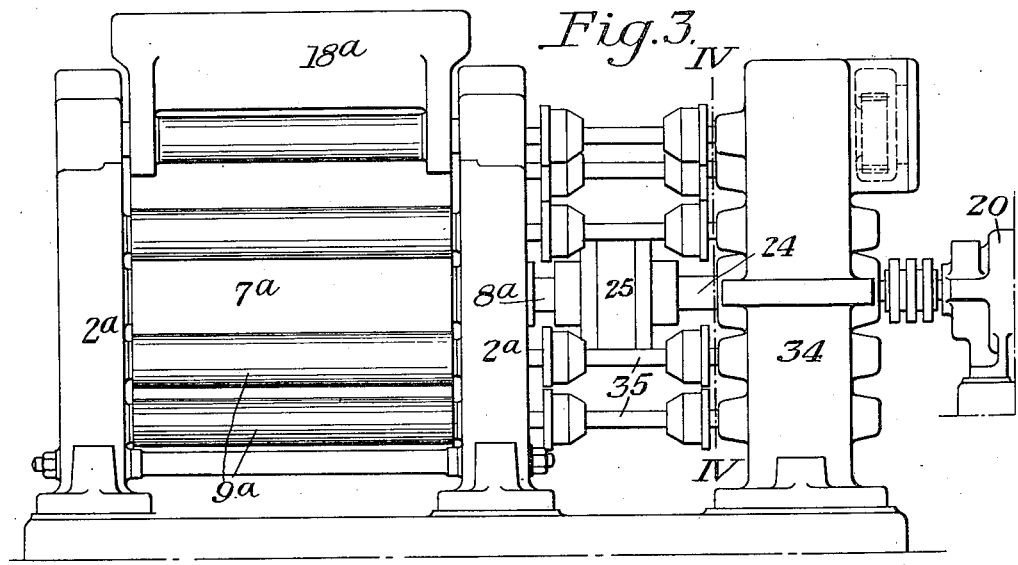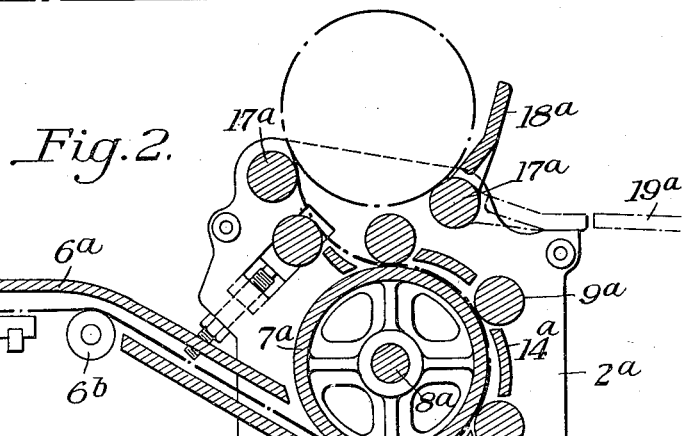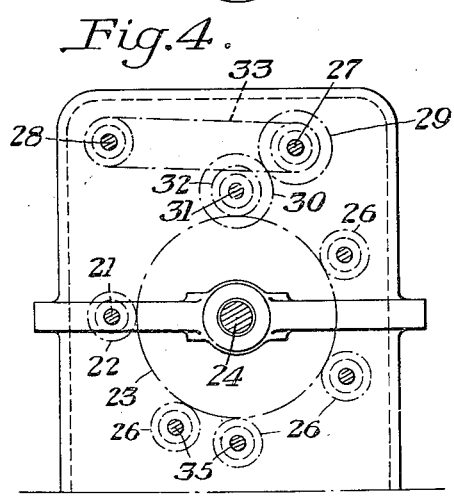

Patented May 28, 1929.

1,715,219

UNITED STATES PATENT OFFICE.

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

APPARATUS FOR STRETCHING AND COILING STRIP MATERIAL.

Application filed September 25, 1926. Serial No. 137,693.

This invention relates to apparatus for stretching and coiling strip material, and is particularly useful for coiling such material as it issues from a rolling mill.

In the coiling of strip material it is highly desirable that it be stretched so as to remove any kinks and thus produce a smooth coil.

I provide an apparatus including a traction drum and means for pressing the strip against the drum at a plurality of points around its periphery. Preferably a number of pressure rolls are employed; these being connected to the drum through suitable gearing so as to rotate at proper speed. I prefer to make the rolls individually adjustable so that the pressure which they exert against the drum may be varied as desired. With such apparatus sufficient force may be applied to the material to make certain that it is properly stretched as it passes to the coiler.

In the accompanying drawings, which illustrate more or less diagrammatically the present preferred embodiment of my invention and one modification thereof,—

Figure 1 is a vertical section through a device embodying the invention;

Figure 2 is a similar view showing a modified structure;

Figure 3 is an end view of the apparatus shown in Figure 2 illustrating the driving mechanism for the drum and the pressure rolls; and Figure 4 is a section taken on the line IV—IV of Figure 3.

Referring first to Figure 1 there is shown a frame consisting of side members 2 connected by spacer arms 3 and supported on a base 4. The frame is placed a short distance away from a material supply means which may be a pair of reducing rolls 3 or a pair of pinch rolls as desired. Guides 6 are provided for guiding the leading edge of the material into the apparatus.

The stretching mechanism comprises a drum 7 mounted on a shaft 8 and having a number of pressure rolls 9 around its periphery. The pressure rolls are each carried in bearing blocks 10 and springs 11 are provided for forcing the rolls against the drum. Preferably, a window 12 is provided in the side frame at each end of each roll and an adjusting screw 13 is placed therein for regulating the compression of the springs 11. Guides 14 are placed between the pressure rolls 9, as shown.

When the material is supplied to the device it takes a path around the drum and pressure is exerted on the material by all of the rolls 9. This insures a firm grip on the material, thus stretching it and removing all kinks therefrom. It will be understood, of course, that the drum and the rolls are run at a proper speed relative to the feed rolls 5 to insure the desired stretching action.

After the material leaves the drum it follows the path indicated by chain lines in the drawing. It first passes over a guide 15 and strikes diverting rolls 16 which cause the material to loop upon itself until finally it is engaged by coiling rolls 17. The material is formed into a coil C and when the piece being worked on is fully coiled a cradle 18 is employed to discharge it from the device. This cradle consists of arms arranged for pivotal movement, and it normally occupies the position shown in solid lines in Figure 1. When it is desired to remove a finished coil from the mill the cradle is shifted from the dotted line position and the material is discharged to a runway 19.

Figure 2 shows an apparatus similar to Figure 1, and like parts have been given the same reference characters with an "a" suffixed thereto. In this form of the invention the guides 6ª are bent and are provided with a roller 6ᵇ whereby the material is first inclined downwardly. This permits of the apparatus being placed a little lower, thus delivering the finished coil at a more accessible height.

Figures 3 and 4 show the drive mechanism for the embodiment of the invention illustrated in Figure 2. It will be understood that similar driving mechanism may be employed for the embodiment of Figure 1. It need differ from the apparatus shown in Figures 3 and 4 only in the location of the gears.

Power is supplied from a motor 20 to a drive shaft 21. A drive pinion 22 is mounted on this shaft and it meshes with a gear 23 which is preferably of the same diameter as the drum 7ª. The gear 23 is mounted on a shaft 24 which is connected to the shaft 8ª through a suitable coupling 25.

Meshing with the gear 23 are pinions 26.

each located substantially co-axially with the pressure rolls 9ª.

The coiler rolls 17ª are driven through shafts 27 and 28. The shaft 27 is provided with a gear 29 meshing with a gear 30 on a shaft 31. The shaft 31 carries a pinion 32 which meshes with the gear 23. The shaft 28 is driven from the shaft 27 through a chain and sprocket connection 33.

All of the gears are mounted in a housing 34 which is spaced away from the coiling and stretching device. Spindles 35 are provided for flexibly connecting the pressure rolls and the coiler rolls with their respective drive shafts, thus permitting adjustment of these rolls as desired.

The apparatus is particularly desirable where it is important that all kinks be removed from the material. The gripping of the material at numerous points makes it possible to apply a very large stretching force to the strip. Preferably, the pressure rolls are placed at points extending at least half-way around the periphery of the drum.

It is not necessary, however, that a number of pressure rolls be used nor is it necessary that they be driven. A drum with a single pressure roll applied thereto would provide a tension device which would be effective for supplying material to a non-tension coiling device, and this arrangement permits of very quick coiling.

I have illustrated and described a preferred embodiment of my invention, but it will be understood that it is not limited to the form shown as it may be otherwise embodied and practiced within the scope of the following claims.

I claim:

1. Apparatus for handling metal strip, comprising a traction drum and a plurality of pressure rolls cooperating therewith, said rolls lying at points spaced at least half-way around the periphery of the drum, and a coiler adapted to receive the strip after it leaves the traction drum.

2. Apparatus for handling metal strip, comprising a traction drum and a plurality of pressure rolls cooperating therewith, the rolls being independently adjustable, and a coiler adapted to receive the strip after it leaves the traction drum.

3. Apparatus for handling metal strip, comprising a traction drum, a plurality of pressure rolls cooperating therewith, and independent spring means for pressing the rolls against the drum, and a coiler adapted to receive the strip after it leaves the traction drum.

4. Apparatus for handling metal strip, including a traction drum, a plurality of adjustable pressure rolls cooperating therewith, drive means for the several rolls, and flexible connecting means between the drive means and the adjustable rolls, and a coiler adapted to receive the strip after it leaves the traction drum.

In testimony whereof I have hereunto set my hand.

FLORENCE C. BIGGERT, Jr.